United States Patent
Savenok

[11] Patent Number: 6,060,006
[45] Date of Patent: May 9, 2000

[54] METHOD OF MANUFACTURE OF SYNTHETIC STONE ARTICLE

[76] Inventor: Peter Savenok, 2S425 Orchard Rd., Wheaton, Ill. 60187

[21] Appl. No.: 09/248,414

[22] Filed: Feb. 11, 1999

[51] Int. Cl.[7] .......................... B29C 39/08; B29C 39/12; B29C 44/06
[52] U.S. Cl. .................. 264/45.7; 264/46.6; 264/69; 264/255; 264/271.1; 264/299; 264/311
[58] Field of Search ...................... 264/45.7, 255, 264/271.1, 310, 311, 299, 46.6, 69

[56] References Cited

U.S. PATENT DOCUMENTS

| | | | |
|---|---|---|---|
| 3,547,747 | 12/1970 | Roberts | 264/45.7 |
| 3,652,748 | 3/1972 | Roberts | 264/45.7 |
| 3,875,275 | 4/1975 | Lemelson | 264/45.7 |
| 3,991,982 | 11/1976 | Yamamoto . | |
| 4,035,978 | 7/1977 | Bajorek et al. . | |
| 4,343,752 | 8/1982 | Cann | 264/69 |
| 4,426,345 | 1/1984 | Bou . | |
| 4,436,500 | 3/1984 | Allen et al. | 425/447 |
| 5,328,651 | 7/1994 | Gallagher et al. | 264/46.1 |
| 5,626,331 | 5/1997 | Erwin . | |
| 5,693,271 | 12/1997 | Johnson et al. | 264/45.7 |
| 5,785,904 | 7/1998 | Abou-Rached | 264/279.1 |
| 5,787,667 | 8/1998 | Sheahan et al. | 52/315 |
| 5,795,513 | 8/1998 | Austin | 269/71 |
| 5,876,021 | 3/1999 | Spence et al. . | |
| 5,957,437 | 9/1999 | Savenok | 256/65 |

*Primary Examiner*—Allan R. Kuhns
*Attorney, Agent, or Firm*—Meroni & Meroni; Charles F. Meroni

[57] ABSTRACT

A baluster or spindle is formed by a casting method, and has a rigid, dense, hollow outer shell forming a decoratively shaped body portion having closed, planar opposed ends. A conduit extends completely through the baluster, providing attachment means to a railing system. The hollow interior of the baluster is injected with a high density polyurethane foam to increase its weight, density, and resistance to breakage. The method of forming a baluster or spindle includes the combined method steps of placement of a mesh sheet adjacent each end of the mold, and then subsequent agitation of the mold. Agitation includes simultaneous spinning and rocking of the mold about its longitudinal axis. The mesh sheet retains the casting material against the end surfaces of the mold, and is completely encapsulated by the casting material such that the mesh sheet is not visible on the surface of the finished product.

21 Claims, 4 Drawing Sheets

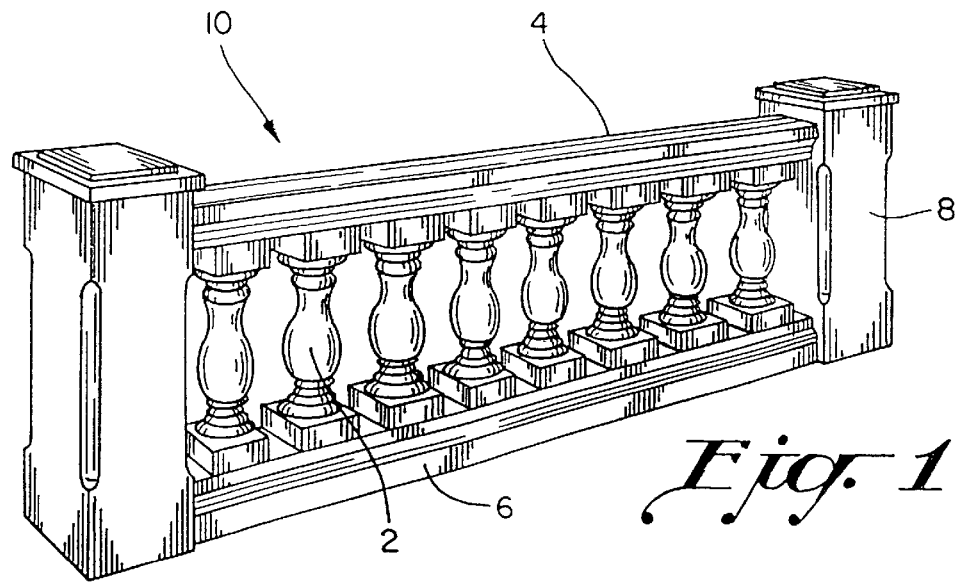
Fig. 1
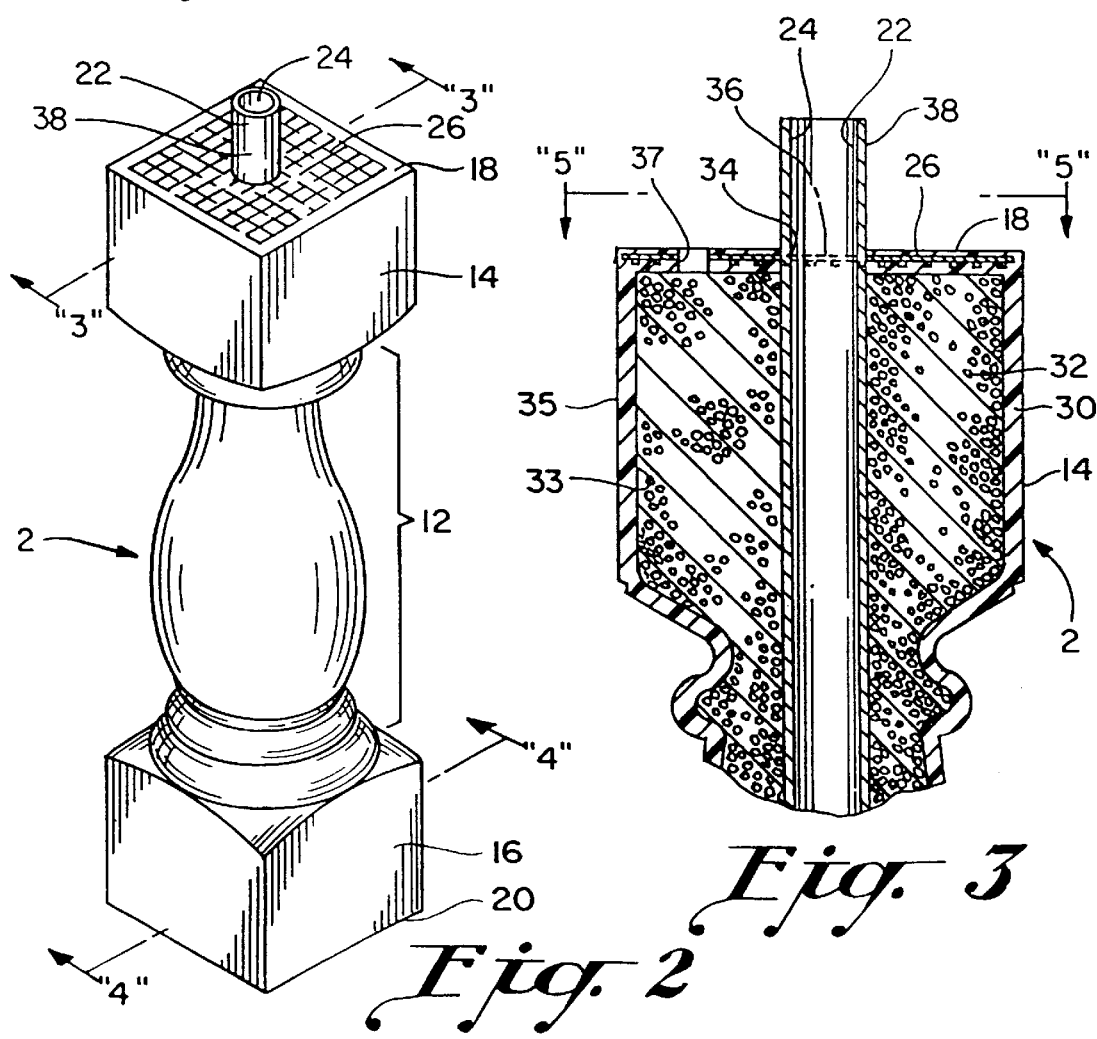
Fig. 2
Fig. 3

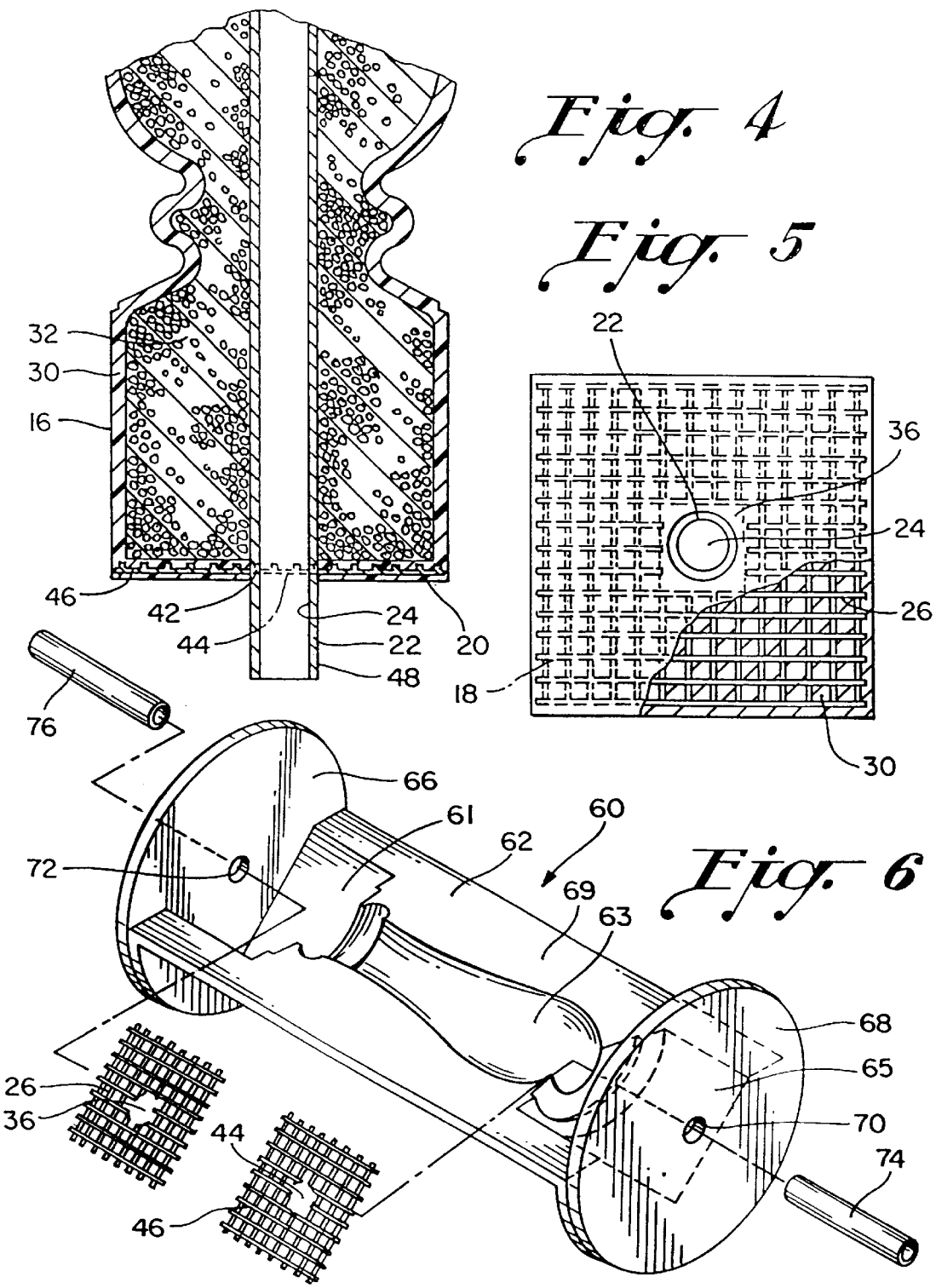

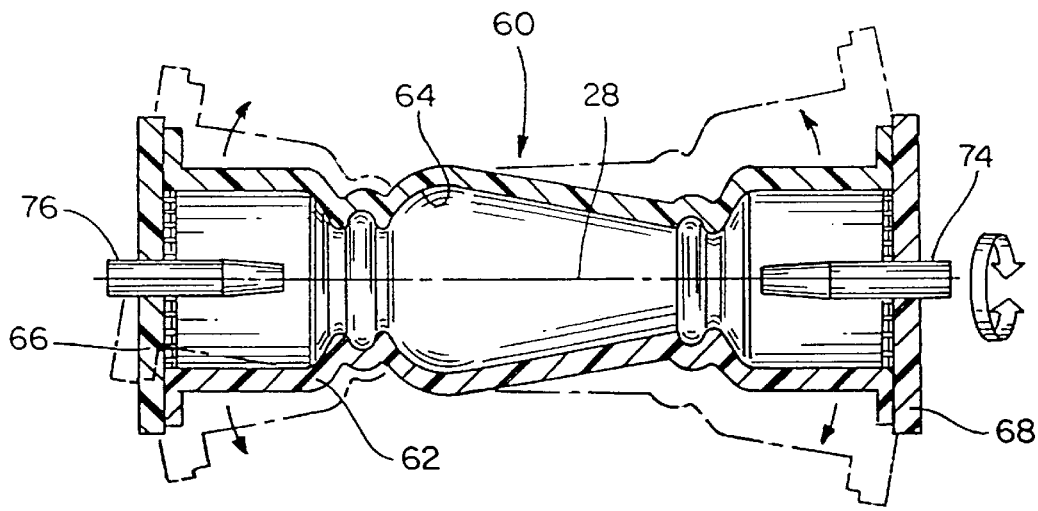
Fig. 7
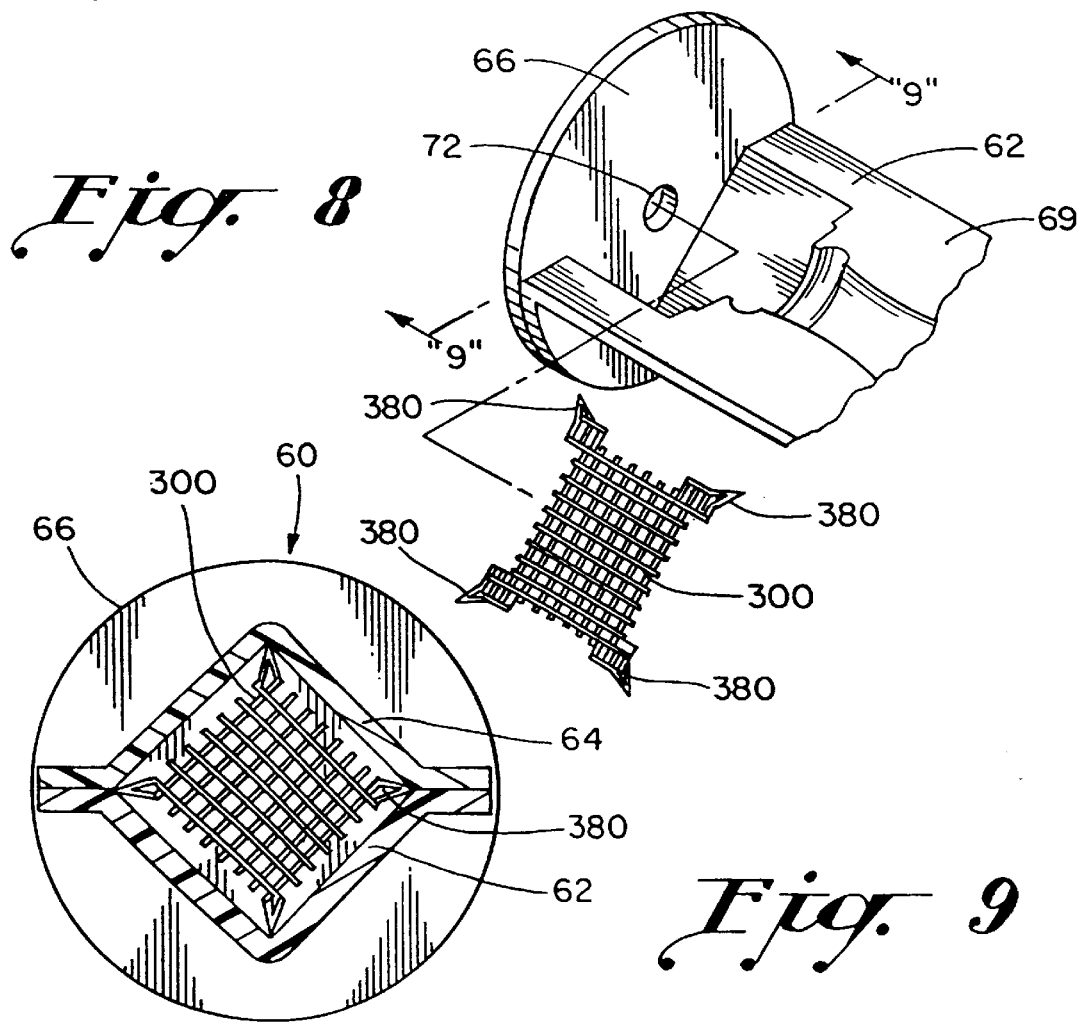
Fig. 8
Fig. 9

METHOD OF MANUFACTURE OF SYNTHETIC STONE ARTICLE

BACKGROUND OF THE INVENTION

This invention is related to an inventive baluster or spindle of synthetic stone material and the method of manufacturing the same. Specifically, the baluster or spindle is manufactured using an inventive molding method which includes the combined use of mesh sheets within the mold and agitation of the mold to produce a superior product.

The baluster or spindle disclosed herein is intended for use in a railing, where the baluster or spindle decoratively supports and separates an upper rail and a lower rail. The baluster is formed of a synthetic stone material which simulates marble, and is fabricated by casting in a mold. In use, the baluster is joined to the upper and lower rails by means of a conduit which is fitted within and extends through the top and bottom ends of the baluster. The conduit has ends which extend in a fitted manner through openings in the closed top and bottom ends of the baluster. The end portions of the conduit are received within openings in the lower surface of the upper rail and the upper surface of the lower rail.

The invention arose from the desire to produce a synthetic stone baluster or spindle in a manner which minimized the use of synthetic stone so to reduce manufacturing costs, yet produced a baluster which closely simulated a stone product in external appearance, performance, and weight.

A manufacturing method was developed to form the baluster or spindle by casting it in a mold which is agitated during the curing phase. The mold for a baluster includes an elongate, shaped body portion. The opposed ends of the mold are closed and flat so as to provide a baluster that has top and bottom surfaces which are planar and oriented perpendicular to the longitudinal axis of the baluster. Agitation of the mold consisted of a combination of rotation of the mold about its longitudinal axis (spinning) concurrent with rotation of the mold about an axis which is perpendicular to the longitudinal axis of the mold (rocking). Spinning and rocking the mold produced a finished product having a hollow interior, and an exterior which was highly dense, uniform, and of high surface quality.

An unsatisfactory result of this method were balusters having top and bottom surfaces which were, at best non-planar or recessed, or at worst completely open. Open ends prevented securement of the conduit within the baluster.

To correct this defect in the finished product, a thin, rigid mesh sheet was placed within the mold adjacent each end of the mold. During agitation, the mesh sheet provided a means by which the synthetic stone material could be retained against the interior surfaces of the ends of the mold.

The resulting baluster consisted of a hard outer shell having closed, flat top and bottom ends. Furthermore, only ¼ as much simulated stone material was required to form baluster a baluster having closed ends when the mesh sheet was employed, resulting in substantial economic benefit to the manufacturer.

SUMMARY OF THE INVENTION

The inventive baluster or spindle is formed by an inventive casting method, and has a rigid, dense, hollow outer shell forming a decoratively shaped body portion having closed, planar opposed ends. A conduit extends completely through the baluster, providing attachment means to a railing system. The hollow interior of the baluster is injected with a high density polyurethane foam to increase its weight, density, and resistance to breakage.

The inventive method of forming a baluster or spindle includes the combined method steps of placement of a mesh sheet adjacent each end of the mold, and then subsequent agitation of the mold. Agitation includes simultaneous spinning and rocking of the mold about its longitudinal axis. The mesh sheet retains the casting material against the end surfaces of the mold, and is completely encapsulated by the casting material such that the mesh sheet is not visible on the surface of the finished product.

BRIEF DESCRIPTION OF THE DRAWINGS

FIG. 1 is a perspective view of a railing constructed using the inventive balusters.

FIG. 2 is perspective view of an individual baluster showing a mesh embedded in the upper end of the baluster and portion of the conduit which extends through the baluster.

FIG. 3 is a partial sectional view across line 3–3 in FIG. 2, showing the completely embedded relationship of the mesh within the top end of the baluster such that the synthetic stone extends through the mesh and forms a planar surface exteriorly to the mesh. This figure also shows the relationship of the synthetic stone shell filled with a high density polyurethane foam with a conduit extending along the centerline and extending from the top end of the baluster.

FIG. 4 is a partial sectional view across line 4–4 in FIG. 2, showing the completely embedded relationship of the mesh within the bottom end of the baluster such that the synthetic stone extends through the mesh and forms a planar surface exteriorly to the mesh. This figure also shows the relationship of the synthetic stone shell filled with a high density polyurethane foam with a conduit extending along the centerline and extending from the bottom end of the baluster.

FIG. 5 is an end view of the baluster as shown along line 5–5 in FIG. 3, the surface of the end of the baluster being partially cut away so as to show that the mesh lies completely within the edges of the end of the baluster, and is completely embedded in the synthetic stone shell.

FIG. 6 is an exploded perspective view of the bottom half of the mold, showing the assembled relationship between the mold, the cylinders, and the mesh sheets.

FIG. 7 is a side sectional view of the assembled mold, the narrow black arrows representing agitation of the mold in a rocking manner along the longitudinal axis, and the wide white arrow representing concurrent agitation of the mold in rotation about the longitudinal axis.

FIG. 8 is an exploded partial perspective view of the bottom half of the mold, showing a second embodiment of the mesh and its orientation within the mold.

FIG. 9 is a sectional end view of the mold taken across line 9–9 in FIG. 8, showing the orientation of the second embodiment of the mesh within the mold, and illustrating how the tabs allow the mesh to maintain proper orientation within the mold, while allowing the edges of the mesh to be removed from the sides of the mold.

DESCRIPTION OF THE PREFERRED EMBODIMENTS

Figure 10:
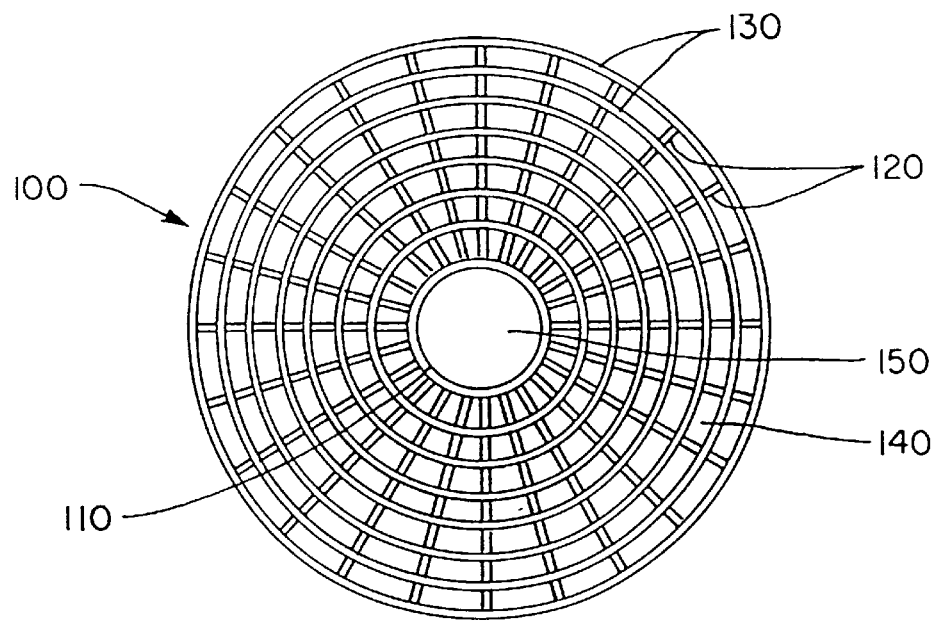
FIG. 10 illustrates the preferred pattern formed in the mesh for use with a baluster having circular ends.

The inventive baluster or spindle 2 is illustrated in FIG. 1 as part of a complete railing 10 which also includes upper 4 and lower 6 rails and support columns 8. Upper 4 and lower 6 rails and support columns 8 are described in separate patent applications.

Baluster 2 is provided with a rectangular upper end 14, a decoratively curved body portion 12, and a rectangular lower end 16. Although the upper 14 and lower 16 ends are illustrated and described herein as rectangular, it is well within the scope of this invention for the ends 14, 16 to be formed in other shapes, such as circular or polygonal. The preferred shape of the body portion is illustrated in FIG. 2, however it is well within the scope of the invention to provide a body portion which has other curvilinear or linear designs. The overall shape of the baluster 2 is determined by a combination of factors which may include aesthetics, structural requirements, manufacturing ease and economics.

Referring now to FIGS. 2 and 3, the baluster 2 will now be described in more detail. Baluster 2 is elongate and consists of a hard outer shell 30 having a hollow interior 32 which is filled with a high density polyurethane foam. In the preferred embodiment, shell 30 is made from a synthetic stone material which simulates marble. It is, however, within the scope of this invention to use other materials to form baluster 2, such as cements, plastics, or composites. Baluster 2 has a closed top edge 18 and closed bottom edge 20. The top 18 and bottom 20 edges are planar and lie perpendicular to the longitudinal axis 28 of the baluster 2. Openings 34, 42 are formed in the upper 18 and lower 20 edges, respectively, to allow passage of conduit therethrough.

Conduit 22 has a length that exceeds that of the baluster 2, and extends completely through the baluster 2 so that the top end 38 of the conduit extends above the top end 18 of baluster 2, and so that the bottom end 48 of the conduit extends below the bottom end 20 of baluster 2. Conduit 22 has a hollow interior 24, and provides structural reinforcement to the baluster as well as an attachment means to upper 4 and lower 6 rails. The top end 38 of conduit 22 is received in a mating channel (not shown) in upper rail 4, while bottom end 48 is receive in a mating channel (not shown) in lower rail 6 during assembly of railing 10.

Baluster 2 is manufactured by molding. A description of the method of manufacturing baluster 2 is provided in a separate section. In order to form a baluster 2 in a mold 60 and achieve a molded product having top ends 18 and bottom ends 20 which are planar, a first sheet of mesh 26 is placed within the mold 60 adjacent the first end 66 of the mold 60 and a second sheet 46 of mesh is placed within the mold 60 adjacent the second end 68 of the mold 60. The reticulated surfaces of mesh sheets 26, 46 act to retain the material which forms the outer surface of baluster 2 against the first 66 and second 68 ends of the mold 60. The resulting product has smooth, planar ends with no depressions or voids.

The mesh is provided in planar sheet form and must be sufficiently stiff to maintain a planar configuration within the mold regardless of the orientation of the mold. The mesh is a network of strands, the strands having a preferred thickness of about ⅛ inch. However, a strand thickness of more or less than ⅛ inch will also provide satisfactory results and is well within the scope of this invention. Effective use of the mesh to maintain the material which forms the outer surface of baluster 2 in a planar orientation is not dependent on the pattern of the network of strands. FIGS. 1–9 illustrate the pattern as a grid where the grid is formed of a set of intersecting perpendicular strands. Spacing between the strands must be sufficient to allow the material which forms the outer surface of baluster 2 to permeate and encapsulate the mesh. The preferred spacing between the strands is about ¼ inch. However, strand spacing of slightly more or less than ¼ inch will provide satisfactory results and is well within the scope of this invention.

Figure 11:
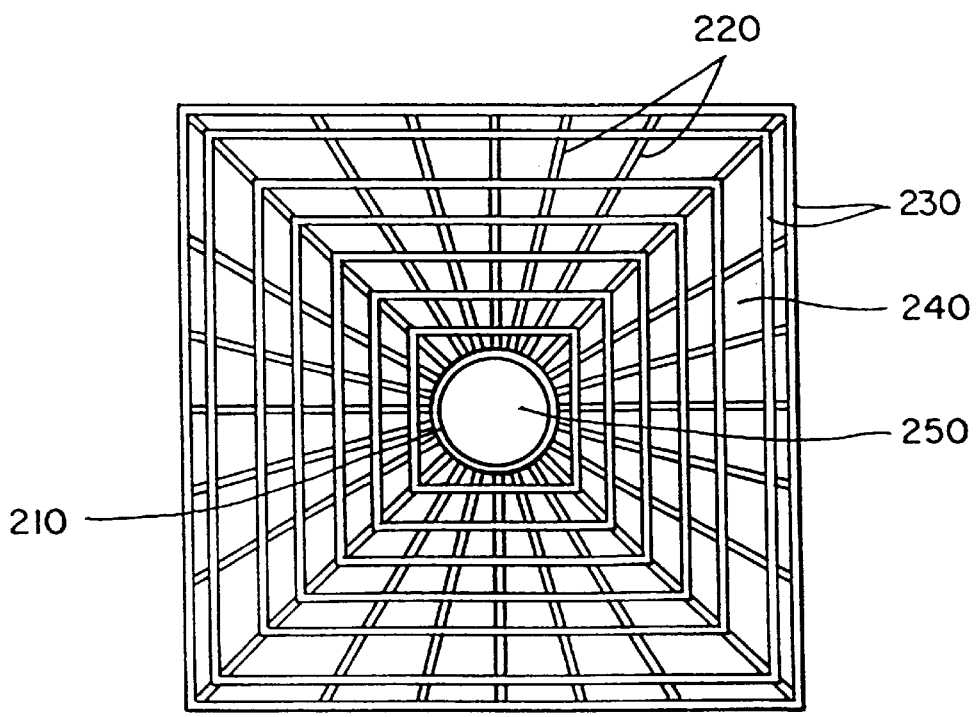
FIG. 11 illustrates the preferred pattern formed in the mesh for use with a baluster having rectangular ends.

FIGS. 10 and 11 illustrate the preferred embodiments of the pattern of strands. FIG. 10 illustrates the preferred pattern for use in formation of a baluster 2 having first and second ends 14, 16 which are circular in cross section. FIG. 11 illustrates the preferred pattern for use in formation of a baluster 2 having first and second ends 14, 16 which are square in cross section. In the preferred patterns, a central ring 110 (FIG. 10), 210 (FIG. 11) is formed by a strand so as to provide openings in the center of the mesh sheet which correspond to openings 36, 44 in FIG. 6. Multiple strands 120 (FIG. 10), 220 (FIG. 11) intersect this central ring 110, 210 and extend radially from it. Preferably, twenty-four radially extending strands 120, 220 are employed, but use of fewer or more strands are within the scope of this invention.

A second set of multiple strands 130 (FIG. 10), 230 (FIG. 11) are arranged concentrically about the central ring 110, 210, intersecting the radially extending strands 120, 220. The configuration of these concentric strands 130, 230 is determined by the shape of the first and second ends 14,16 of the finished baluster 2. Thus, concentric circles are used for a baluster 2 having first and second ends 14, 16 of circular cross section, and concentric squares are used for a baluster 2 having first and second ends 14, 16 of square cross section. This preferred concentric pattern can be adapted for balusters 2 having first and second ends 14, 16 of any shape. The concentric strands 130, 230 are not at regularly spaced intervals from the central ring 110, 210. Instead, the distance of a specific concentric strand 130, 230 from the central ring is determined by the variations in size of the ends of finished balustrades. Additional concentric strands are added to the pattern provide adequate surface area for retention of the material which forms the outer shell of the balustrade 2.

The preferred embodiments of mesh sheets 100, 200 as shown in FIGS. 10 and 11, respectively, are fabricated by mold, and are created in a single oversized size. Then, the mesh sheet 100, 200 is cut to the size required by a specific application using the appropriate concentric strand 130, 230 as a guide. Thus a single mold can be used to fabricate mesh sheets 100, 200 for balusters 2 having first and second ends 14, 16 of various sizes. Preferably, the peripheral edge of the mesh sheet is sized to be slightly less than the dimensions of the ends 14, 16 of the baluster 2. This sizing insures that the peripheral edge of the mesh is completely embedded within the baluster material, and is not seen on the outer surface of the baluster 2. However, it is within the scope of the invention that the mesh sheet be sized to have the same dimensions or even slightly greater dimensions than the dimensions of the ends 14, 16 of the baluster, allowing the peripheral edge to protrude slightly from the surface of the baluster 2.

The above embodiments of mesh sheets 26, 100, 200 may be modified to prevent the peripheral edges of the mesh sheet from extending through the outer surface 35 of the finished baluster 2. Specifically, the modified mesh sheet 300 may be provided with tabs 380 placed in a spaced apart manner about its periphery. The tabs 380 allow the mesh sheet 300 to maintain the proper orientation (FIG. 9) within the mold 60 while allowing the peripheral edges of the mesh sheet to reside adjacent to but recessed from interior surface of the mold 61, 65, and thus the exterior surface 35 of the balustrade. This feature allows filler material to completely surround much of the periphery of the mesh sheet, providing a finished product which has a smooth surface unblemished by the presence of the mesh. Tabs 380 are preferably triangular in shape and oriented along the periphery so that an apex 385 extends radially away from the center of the mesh sheet 300. Tabs 380 may be flat such that they coincide with the plane of the mesh sheet 300. Alternatively, the tabs 380 may be shaped such that the thickness of apex 385 tapers to a point.

Method of Manufacture

A method for manufacturing baluster 2 will now be described. Although the method steps are described in reference to baluster 2 as disclosed above, the inventive manufacturing method is generally applicable to the fabrication of molded products having an elongate shaped body and which require end surfaces which are planar. The molded product may used as a support and/or decorative structure. Other possible applications of the following method of manufacture include, but are not limited to, fabrication of table or chair legs, lamp posts, or decorative columns.

The method requires the use of a mold 60. Mold 60 is an elongate hollow shell which is split along its length, resulting in a first half 62 and a second half 64. The first half 62 of the mold 60 will be described in detail since the second half 64 of the mold is substantially a mirror image. The mold has a closed first end 66, and a closed second end 68 which correspond to the top 18 and bottom 20 edges, respectively, of the finished molded product. The shank 69 of the mold extends between the first 66 and second 68 ends, and provides a shaped inner surface 61, 63, 65, which forms the corresponding first end 14, body portion 12, and second end 16, respectively, of the molded product. An opening 70, 72 is provided in each of the first 66 and second 68 ends of the mold to allow for insertion of cylindrical rods 74, 76.

Cylindrical rods 74, 76 are elongate cylinders. They may be hollow with closed ends, or alternatively may be solid. Cylindrical rods 74, 76 may terminate in ends which are flat, as shown in FIG. 6, or may have a tapered diameter on the end which is inserted into the mold 60, as shown in FIG. 7. The outer diameter of the cylindrical rods 74, 76 is the same as that of the conduit.

In use, the cylindrical rods 74, 76 are inserted into the first 66 and second 68 ends of the mold 60 such that the cylindrical rods 74, 76 are supported in space by the mold 60 and remain within the ends 66, 68 of the mold 60. That is, a portion of each of the cylindrical rods 74, 76 extends a distance into the interior of the mold 60, while the opposed end of each cylindrical rod 74, 76 remains outside of the mold 60.

Cylindrical rods 74, 76 are used in conjunction with mold 60 for two reasons. First, when the rods 74, 76 are in place during the formation of the baluster 2, and are subsequently removed after the filler material has set up, they each leave a vacancy in the top 18 and bottom 29 edges of the baluster 2 which allows insertion of the conduit through the molded product. Second, during formation of the baluster 2, cylindrical rods 74, 76 extend inwardly from each end 66, 88 of the mold 60 and provide attachment points to maintain the mesh sheets 100, 200 in position adjacent the ends 66, 68 of the mold. Specifically, the central ring 110, 210 of the mesh sheet encircles the cylindrical rods 74, 76. Mesh sheets 100, 200 are prevented from shifting position within the mold because of this configuration.

In cases where the cross sectional diameter of the baluster or spindle is small, the resulting baluster 2 may be nearly solid. In these cases, the baluster 2 may be cast with the conduit 22 inserted through the openings in the mold in place of the cylindrical rods 74, 76.

The method steps are as follows:

1. Separation of the first half 62 from the second half 64 of mold 60. This allows access to the interior of the mold 60 as required in steps 2–5.

2. Insertion of the cylindrical rods 74, 76 in the openings 72, 70 of the first end 66 and the second end 68, respectively, of the mold 60. As described above, a first end of each of the cylindrical rods 74, 76 extends a distance into the interior of the mold 60, while the opposed end of each cylindrical rod 74, 76 remains outside of the mold 60.

3. Placement of a first mesh sheet 26 within the mold 60 so that it lies adjacent the first end 66 and so that the cylindrical rod 76 extends through the opening 36 of the first mesh sheet 26. Likewise, the second mesh sheet 46 is placed within the mold 60 so that it lies adjacent the second end 68 and so that the cylindrical rod 74 extends through the opening 44 of the second mesh sheet 46.

5. Placement of non-cured filler material within the mold 60. When cured, the filler material forms the hard outer shell 30 of the balustrade 2. This material is preferably a synthetic stone material which simulates marble. However, this material could also be a cement, plastic, or other material which would provide suitable finished qualities for a given application of the method. The non-cured filler material is generally in liquid form.

6. Rejoin the first half 62 and the second half 64 of the mold 60.

7. Agitation of the mold 60. To allow the filler material to completely coat the interior surfaces 61, 63, 65 of the mold 60, and to ensure that the filler material properly encapsulates the mesh sheets 26, 46 and permeates the spaces within the mesh sheets 26, 46, the mold 60 is rotated about an axis which is perpendicular to its longitudinal axis 28 (rocked) while being simultaneously rotated about its longitudinal axis 28 (spun). These motions are illustrated in FIG. 7 by the thin black arrows and wide white arrows, respectively. The end result of agitation is a baluster which has a closed, dense, exterior surface and a hollow interior.

8. The mold 60 is allowed to rest, allowing the filler material to substantially, but not completely, cure.

9. Separation of the first 62 and second half 64 of the mold 60.

10. Removal of the cylindrical rods 74, 76 from the mold 60 by longitudinal withdrawal of the cylindrical rods 74, 76 from the respective openings 70, 72 in the respective ends 68, 66 of the mold 60. This results in creation of the openings 34, 42 in each end of the molded product.

11. Removal of the baluster 2 from the mold 60.

12. The baluster 2 is allowed to rest, allowing the filler material to completely cure.

13. Insertion of the conduit 22 into the baluster such that it passes through the openings 34, 42 in each end of the baluster 2 and extends through the baluster 2 such that the middle portion of the conduit 22 remains inside the baluster 2 and the ends 38, 48 of the conduit 22 remain outside the baluster 2.

14. Formation of small channel 37 through the top edge 18 of the baluster 2 so as to provide a passageway to the hollow interior of the baluster 2.

15. Injection of a high density foam 32 through the small channel 37 so as to fill the hollow interior of the baluster 2, providing the baluster 2 with increased weight, density, and resistance to breakage.

16. Finishing of the outer surface 35 of the baluster 2. An example of finishing includes removal of any surface imperfections resulting from the use of mold by sanding or other means.

This inventive method uses a material retention means such as a mesh sheet in combination with a rotational molding technique to retain the casting material against the interior surfaces of a mold. The mesh sheet retains the casting material against the end surfaces of the mold, and is completely encapsulated by the casting material such that the mesh sheet is not visible on the surface of the finished product. The resulting product has the desired surface shape and requires seventy-five percent less casting material than does a product formed without the mesh sheet.

I claim:

1. A method for manufacturing a molded product of synthetic stone, the molded product comprising an elongate body having a first end, a second end, and a body portion extending between said first and second ends, wherein the first end and second end are each planar and are each oriented perpendicular to the longitudinal axis of the body portion, the method comprising the use of a mold, filler material, blank means for formation of a channel within the molded product, and material retention means wherein the material retention means maintains the filler material in a desired position within the mold, the mold comprising an elongate hollow shell, the mold being bisected to provide a first half and a second half, the mold comprising a first end, a second end, and a body portion which correspond to the first end, second end, and body portion, respectively, of the molded product, the first end and second end of the mold each being provided with an opening, the first end and second end of the mold each having a size and shape, and wherein the first end is the same size and shape as the second end, the method steps comprising, 1. separation of first half and said second half of said mold,
2. insertion of the blank means in the openings of the first end and the second end of the mold,
3. placement of the material retention means adjacent an interior surface of both the first end and the second end of the mold,
4. placement of filler material within the mold,
5. rejoining the first half and the second half of the mold,
6. agitation of the mold,
7. the mold is allowed to rest, allowing the filler material to substantially, but not completely, cure,
8. separation of the first and second half of the mold, removal of the moded peoductfrom the mold,
10. the molded product is allowed to rest, allowing the filler material to completely cure.

2. The method of claim 1 wherein the blank means comprises a pair of elongate cylinders, each cylinder having a first end, a second end, and a body portion, the first end of each cylinder having a tapered diameter and wherein said first end and body portion of the first cylinder of said pair of cylinders is inserted through the opening of the first end of the mold, and wherein the first end and body portion of the second cylinder of said pair of cylinders is inserted through the opening of the second end of the mold, so that the first ends and body portions of the respective cylinders remain inside the mold, and so that the second ends of the respective cylinders remain outside the mold.

3. The method of claim 1 wherein the material retention means is comprised of a mesh, the mesh having a thickness, a shape which corresponds to the shape of the first end and the second end of the mold, and size which is slightly less than the size of the first end and the second end of the mold.

4. The method of claim 3 wherein the material retention means is provided with a hole, the hole being spaced from the periphery of the material retention means, and wherein a method step is inserted following step 2 above as follows:

method step 2a. placement of the material retention means on the blank means such that the blank means passes through the hole in the material retention means.

5. The method of claim 4 wherein the material retention means has a thickness of about ⅛ inch.

6. The method of claim 4 wherein the mesh of the material retention means is provided with a pattern, and wherein the pattern is comprised of spokes and bands such that the spokes extend radially outward from the hole and such that the bands surround the hole at various distances from the hole, the spokes and bands intersecting to form a web of material with vacancies between the spokes and bands.

7. The method of claim 6 wherein the pattern is dependent on the shape of the first end and the second end of the mold such that the shape of the bands corresponds to the shape of the first end and the second end of the mold.

8. The method of claim 4 wherein the material retention means is further provided with at least two triangular tabs placed about and extending from the periphery of the mesh such that an apex of the triangular tap extends radially outward from the center of the material retention means.

9. The method of claim 4 wherein the filler material is comprised of a synthetic stone material.

10. The method of claim 4 wherein the mold is agitated, and wherein said agitation comprises rotation of the mold about its longitudinal axis and concurrent rotation of the mold about an axis which is perpendicular to the longitudinal axis, the agitation allowing the filling material to spread uniformly through out the mold and providing, a molded product which is hollow and which has an outer surface shape with corresponds to the inner surface shape of the mold.

11. The method of claim 10 wherein the following method step is added following method step 8 as follows:

method step 8a. removal of the turning means from the mold by longitudinal withdrawal of the cylinders from the openings in both the first end and the second end of the mold so as to provide first openings in each end of the molded product.

12. The method of claim 11 wherein a conduit is provided, the conduit having an outer diameter which is sized to be fittingly received within the first openings in each end of the molded product, the conduit also having a first end, a second end, a body portion, and a length which is longer than the length of the molded product, and wherein a method step is added following method step 10 as follows:

method step 11. insertion of a conduit into the molded product such that it passes through the first openings in each end of the molded product and extends through the molded product such that the body portion of the conduit remains inside the molded product and the first and second ends, respectively, of the conduit remain outside the molded product.

13. The method of claim 12 wherein the following method steps are inserted after step number 11 as follows:

method step 12. formation of channel through the first end of the molded product so as to provide a passageway to the hollow interior of the molded product, method step 13. injection of a high density foam through the channel so as to fill the hollow interior of the molded product, providing the molded product with increased weight, density, and resistance to breakage.

14. A method for manufacturing a hollow structure from a synthetic stone, wherein the hollow structure is comprised of an elongate body, a closed, rigid outer shell, and two ends which are opposed, planar, and lie perpendicular to the longitudinal axis of the body, wherein a mold is provided, the mold having an interior surface, the interior surface having a shape which corresponds to the shape of the outer surface of the hollow structure, the mold being separable into two halves, wherein material retention means are provided, wherein casting material made of synthetic stone is provided, the method steps as follows:
1. separation of the mold halves,
2. placement of material retention means in the mold such that it lies adjacent the interior surface of the mold,
3. placement of casting material within the mold,
4. rejoining of the mold halves,
5. agitation of the mold,
6. separation of the mold halves,
7. removal of the hollow structure from the mold.

15. The method of claim 14 wherein the material retention means comprises a mesh sheet.

16. The method of claim 14 wherein agitation comprises rotation of the mold about its longitudinal axis concurrent with rotation of the mold about an axis which is perpendicular to the longitudinal axis, the agitation allowing the filling material to spread uniformly through out the mold and providing a molded product which is hollow and which has an outer surface shape with corresponds to the inner surface shape of the mold.

17. The method of claim 14 wherein the method step number 8 is as follows: injection of a high density polyurethane foam into the hollow interior of the hollow structure.

18. The method of claim 14 wherein the material retention means has a shape which corresponds to the shape of the ends of the hollow structure, and a size which is slightly less than the size of the hollow structure, wherein the material retention means is reticulated, the spaces between the reticule being vacant to allow passage of casting material therethrough, the material retention means being placed within the mold adjacent the portions of the mold which correspond to the ends of the hollow structure.

19. A method of centrifugal casting using mold having an elongate hollow body and flat, opposed ends, the mold being split to form opposed mold halves, wherein the improved method steps are as follows,
1. opening of the mold halves,
2. placement of casting material comprised of a synthetic stone within the mold,
3. rejoining the mold halves,
4. spinning and rocking the mold while contemporaneously holding the casting material at opposed ends of the mold so as to maintain casting material adjacent an inner surface of the mold in opposition to centrifugal displacement forces caused by the spinning and rocking motions,
5. separation of the mold.

20. The method of claim 19 wherein the casting material is held at opposed ends of the mold by placement of a textured surface within the mold adjacent each of the ends of the mold.

21. The method of claim 20 wherein the textured surface comprises a mesh sheet.

* * * * *